July 5, 1932.  H. G. CUNNINGHAM  1,866,014
FILM RACE FOR CAMERAS
Filed June 16, 1930
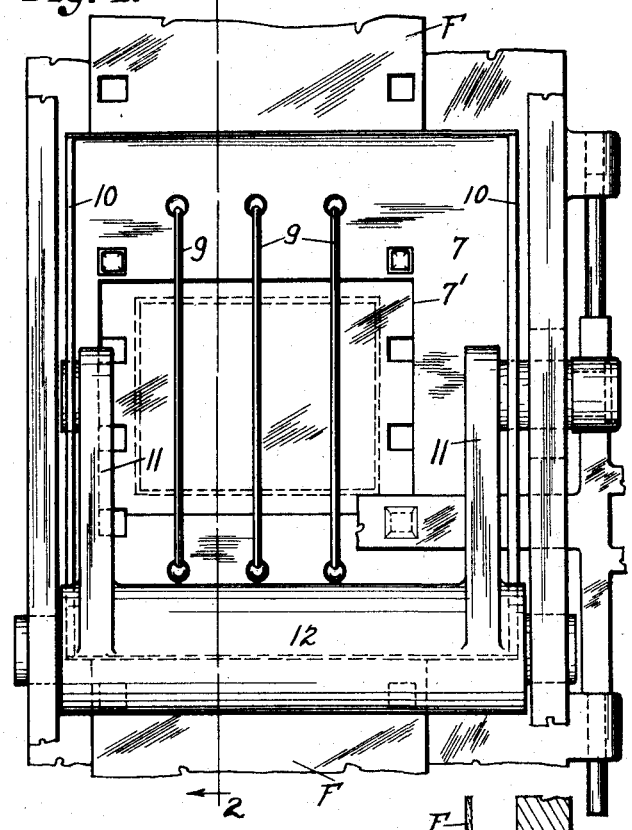
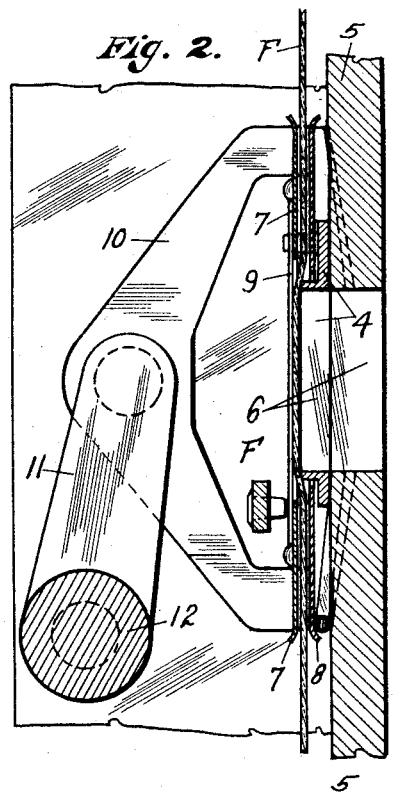
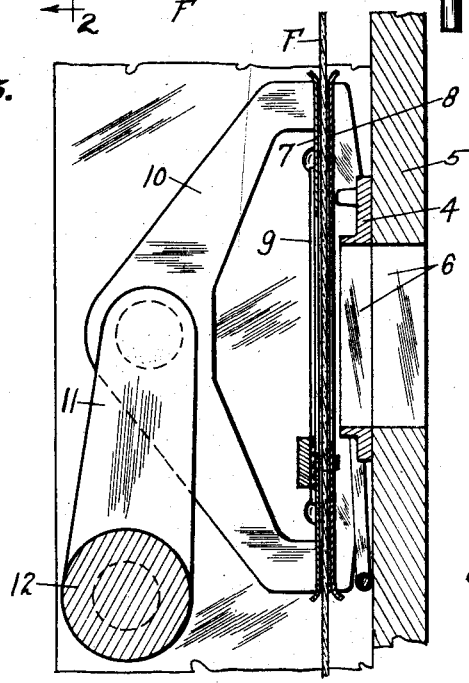
INVENTOR.
Harry G. Cunningham
BY
Attorneys.

Patented July 5, 1932

1,866,014

UNITED STATES PATENT OFFICE

HARRY G. CUNNINGHAM, OF LOS ANGELES, CALIFORNIA

FILM RACE FOR CAMERAS

Application filed June 16, 1930. Serial No. 461,410.

My invention relates to the film race through which the film of a camera moves and which operates to intermittently press said film against the camera aperture frame during the intermittent exposure, whereby to hold the film snugly over the opening during the exposure thereof to the light through said opening. In making talking or sound pictures, it is necessary to eliminate everything which produces any noise or clicks or other sound which can be reproduced in connection with the picture. In the present film races, there is one solid plate back of the film which moves against it and presses the film over the aperture closely so as to get better results in taking pictures, and this solid plate is objectionable in that it makes a noise which is perceptible in connection with talking pictures. I have conceived the idea of replacing this solid plate with a plurality of cross wires whereby to contact and press the film against the aperture frame with these cross wires, thus providing a minimum of contact and yet getting the desired result of holding the film snugly against the aperture frame for the picture.

In order to explain my invention, I have illustrated the same on the accompanying sheet of drawing, which I will now describe.

Figure 1 is a face view of a film race showing the opening in the plate with the cross wires for contacting and pressing a film over the aperture fame;

Figure 2 is a vertical sectional view thereof, taken on line 2—2 of Fig. 1; and

Fig. 3 is a similar view with the film race moved back from the aperture plate, as it is during the movement of the film.

Referring now in detail to the drawing, 4 designates an aperture frame, on a body member 5, with aperture 6, therethrough for the light to pass to the film, F. The film race comprises two spaced plates or frames, 7 and 8, secured together to be moved as a unit to and from the aperture frame 4, and between these plates the film F moves. Instead of making the plate or frame 7 solid, as it is now made, I have cut out an opening 7' therein, and have mounted on said plate, across said opening 7', a plurality of wires 9, 9, said plates 7 and 8 being supported by two side yokes 10, 10. The supporting and moving yokes 10, 10 are pivotally supported upon the upper arms 11, 11, of a rocker member 12. As these supporting and operating members are standard construction and form no part of my invention, it is not necessary to show more or to explain their operation. The invention resides in the provision of cross wires 9, 9, for engaging and pressing a film snugly over the aperture of the aperture frame 4, and to thus eliminate an objectionable click or sound which is present when a solid plate is used for the plate 7.

In Fig. 2 the film race is shown moved forwardly with the film F pressed snugly over the light aperture 6, the view being enlarged and exaggerated to better illustrate the use and operation of the device. In Fig. 3, this film race is shown moved away from the aperture frame for the movement of the film between the plates or frame members 7 and 8, constituting what I have called the film race.

While I have shown and described one embodiment of my invention, being a plate or frame structure with an opening therethrough, with the cross wires for contacting the film as said plate is moved against the film for the purpose of pressing it against the aperture frame, I do not limit my invention to the details of construction and arrangement shown, except as I may be limited by the hereto appended claims.

I claim:

1. In a film race, two spaced frame members between which a film can run, said frame members being open in their middle portions, one of said members having a plurality of cross wires across its opening to engage and press the film over the light aperture.

2. In a film race, two supporting yokes, two spaced frame members supported thereby to be moved as a unit, one of said frame members having cross wires across its opening to contact and press a film against an aperture frame.

3. In combination with an aperture frame through which light can pass, a plate over said frame, said plate being open over the opening in said aperture frame, and a plurality of wires across said opening in said plate and adapted to press a film against said aperture frame.

Signed at Los Angeles, Los Angeles County, California, this 7 day of June, 1930.

HARRY G. CUNNINGHAM.